United States Patent
Byrne

(10) Patent No.: US 9,822,733 B2
(45) Date of Patent: Nov. 21, 2017

(54) AERODYNAMIC FEATURE FOR AFT EDGE PORTIONS OF THRUST REVERSER LOWER BIFURCATION WALL

(71) Applicant: Rohr, Inc., Chula Vista, CA (US)

(72) Inventor: Stuart J. Byrne, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 726 days.

(21) Appl. No.: 14/262,220

(22) Filed: Apr. 25, 2014

(65) Prior Publication Data

US 2015/0308375 A1    Oct. 29, 2015

(51) Int. Cl.
*F02K 1/72* (2006.01)
*F02K 1/56* (2006.01)
*F02K 1/78* (2006.01)

(52) U.S. Cl.
CPC ............. *F02K 1/566* (2013.01); *F02K 1/78* (2013.01); *F02K 1/72* (2013.01)

(58) Field of Classification Search
CPC ..... F02K 1/72; F02K 1/64; F02K 1/70; F02K 1/766
USPC .................................. 60/226.2, 770
See application file for complete search history.

(56) References Cited

U.S. PATENT DOCUMENTS

| | | | |
|---|---|---|---|
| 3,541,794 A | 11/1970 | Johnston et al. | |
| 3,779,010 A * | 12/1973 | Chamay | F02K 1/09 239/265.31 |
| 4,044,973 A | 8/1977 | Moorehead | |
| 4,541,673 A * | 9/1985 | Greiert | F02K 1/72 384/29 |
| 4,683,717 A * | 8/1987 | Naud | B64D 29/08 60/226.1 |
| 5,054,285 A * | 10/1991 | Geidel | F02K 1/72 239/265.39 |
| 5,239,822 A | 8/1993 | Buchacher | |
| 5,251,435 A | 10/1993 | Pauley | |
| 5,806,302 A | 9/1998 | Cariola | |
| 5,853,148 A * | 12/1998 | Standish | F02K 1/72 239/265.29 |
| 5,863,014 A * | 1/1999 | Standish | F02K 1/70 239/265.29 |
| 6,173,807 B1 | 1/2001 | Welch et al. | |
| 6,557,799 B1 | 5/2003 | Sternberger | |
| 8,051,639 B2 | 11/2011 | Lair | |
| 8,127,530 B2 | 3/2012 | Lair et al. | |
| 9,004,855 B2 * | 4/2015 | Vauchel | B64D 29/06 415/126 |

(Continued)

*Primary Examiner* — William H Rodriguez
(74) *Attorney, Agent, or Firm* — O'Shea Getz P.C.

(57) ABSTRACT

A thrust reverser of a propulsion system nacelle is provided. The thrust reverser includes a fixed structure, a translating structure, and an aerodynamic feature. The fixed structure includes an annular wall that partially defines an annular bypass airstream duct. The fixed structure is bifurcated into left and right side sections. The annular wall extends between upper and lower bifurcation walls of the left side section, and extends between upper and lower bifurcation walls of the right side section. The translating structure is moveable relative to the fixed structure, between a stowed position and a deployed position. The aerodynamic feature that includes a flange disposed relative to an aft end portion of one of the lower bifurcation walls. The flange aids in preventing aerodynamic drag.

8 Claims, 10 Drawing Sheets

(56) References Cited

U.S. PATENT DOCUMENTS

| | | | |
|---|---|---|---|
| 2011/0120078 A1* | 5/2011 | Schwark, Jr. | F02K 1/72 60/226.2 |
| 2011/0167790 A1* | 7/2011 | Cloft | F02K 1/68 60/226.2 |
| 2013/0319002 A1 | 12/2013 | Sidelkovskiy et al. | |
| 2016/0032779 A1* | 2/2016 | Sawyers-Abbott | F01D 25/246 60/805 |

* cited by examiner

AERODYNAMIC FEATURE FOR AFT EDGE PORTIONS OF THRUST REVERSER LOWER BIFURCATION WALL

BACKGROUND

1. Technical Field

Aspects of the present invention relate to a thrust reverser of a propulsion system nacelle, and more particularly relate to an aerodynamic feature for aft edge portions of a thrust reverser lower bifurcation wall.

2. Background Information

It is known to provide a propulsion system that includes an engine (e.g., a gas turbine engine), a nacelle that at least partially surrounds the engine, and a pylon that connects the engine and the nacelle to a vehicle (e.g., an aircraft). In some instances, the thrust reverser includes a fixed structure and a translating structure that at least partially define an annular bypass airstream duct. The fixed structure includes a radially outer fixed structure and a radially inner fixed structure. The outer fixed structure includes an annular cascade array. The inner fixed structure includes an annular wall having a wall outer surface and a wall inner surface. The wall outer surface partially defines the bypass airstream duct, and the wall inner surface partially defines a cavity through which a portion of the engine extends. The translating structure includes a translating sleeve and a plurality of blocker doors. The translating structure is moveable relative to the fixed structure, between a stowed position (e.g., during a forward thrust operation) and a deployed position (e.g., during a thrust reversing operation). When the translating structure is in its stowed position, a bypass airstream can pass from a forward end of the bypass duct to an aft end of the bypass duct and a nozzle, through which it can be discharged to provide forward thrust. In the stowed position, the translating sleeve prevents the bypass airstream from passing through the cascade array. When the translating structure is moved from its stowed position to its deployed position, the translating sleeve moves relative to the fixed structure and the blocker doors are drawn down into the bypass duct, thereby exposing the cascade array to the bypass airstream and the ambient air surrounding the thrust reverser. The blocker doors redirect a portion of the bypass airstream toward the cascade array, through which the bypass airstream can be discharged to generate reverse thrust.

In known thrust reverser designs, the inner fixed structure of the thrust reverser (like the thrust reverser as whole) is bifurcated into a left side section and a right side section. The left and right side sections of the inner fixed structure each include an upper bifurcation wall and a lower bifurcation wall. The annular wall extends between the respective upper and lower bifurcation walls of the left and right side sections of the inner fixed structure. The lower bifurcation walls each extend between a forward edge portion and an aft edge portion. The lower bifurcation walls of the left and right side sections are disposed relative to one another. The respective aft edge portions of the lower bifurcation walls typically have a blunt, non-aerodynamic shape that can cause aerodynamic drag due to flow separation. Aspects of the present invention are directed to this and other problems.

SUMMARY OF ASPECTS OF THE INVENTION

According to an aspect of the present invention, a thrust reverser of a propulsion system nacelle is provided. The thrust reverser includes a fixed structure, a translating structure, and an aerodynamic feature. The fixed structure includes an annular wall that partially defines an annular bypass airstream duct. The fixed structure is bifurcated into left and right side sections. The annular wall extends between upper and lower bifurcation walls of the left side section, and extends between upper and lower bifurcation walls of the right side section. The translating structure is moveable relative to the fixed structure, between a stowed position and a deployed position. The aerodynamic feature that includes a flange disposed relative to an aft end portion of one of the lower bifurcation walls. The flange aids in preventing aerodynamic drag.

According to another aspect of the present invention, an aerodynamic feature for use in a thrust reverser of a propulsion system nacelle is provided. The thrust reverser includes a fixed structure and a translating structure that is moveable relative to the fixed structure. The fixed structure includes an annular wall that partially defines an annular bypass airstream duct. The fixed structure is bifurcated into left and right side sections. The annular wall extends between upper and lower bifurcation walls of the left side section, and between upper and lower bifurcation walls of the right side section. The aerodynamic feature includes a flange disposed relative to an aft end portion of one of the lower bifurcation walls. The flange aids in preventing aerodynamic drag.

Additionally or alternatively, the present invention may include one or more of the following features individually or in combination:

- the flange aids in preventing aerodynamic drag due to flow separation;
- the aerodynamic feature is configured to permit relative movement of the respective aft edge portions of the lower bifurcation walls;
- the flange, and the aft end portion that the flange is disposed relative to, generally extend along a common axis;
- the aft end portion of the lower bifurcation wall of the left side section generally extends along a first axis; the aft end portion of the lower bifurcation wall of the right side section generally extends along a second axis; the flange includes a first end, a second end, a bent segment, a first intermediate segment that extends between the first end and the bent segment, and a second intermediate segment that extends between the bent segment and the second end; and the first intermediate segment generally extends along the first axis and the second intermediate segment generally extends along the second axis;
- the first intermediate segment of the flange is connected to the aft end portion of one of the lower bifurcation walls; and the bent segment is resilient, and biases the second intermediate segment of the flange towards the aft end portion of the other lower bifurcation wall;
- the flange is a first flange and the aerodynamic feature further includes a second flange; the first and second flanges each include a first end, a second end, and an intermediate segment extending between the first and second ends; and the first flange is connected to the aft end portion of one of the lower bifurcation walls proximate the first end of the first flange, and the second flange is connected to the aft end portion of the other lower bifurcation wall proximate the first end of the second flange;
- the respective second ends of the first and second flanges are configured to mate with one another; and
- the respective intermediate segments of the first and second flanges are resilient, and bias the first and second flanges toward one another such that the respective second ends of the first and second flanges mate.

These and other aspects of the present invention will become apparent in light of the drawings and detailed description provided below.

DETAILED DESCRIPTION OF ASPECTS OF THE INVENTION

Figure 1:
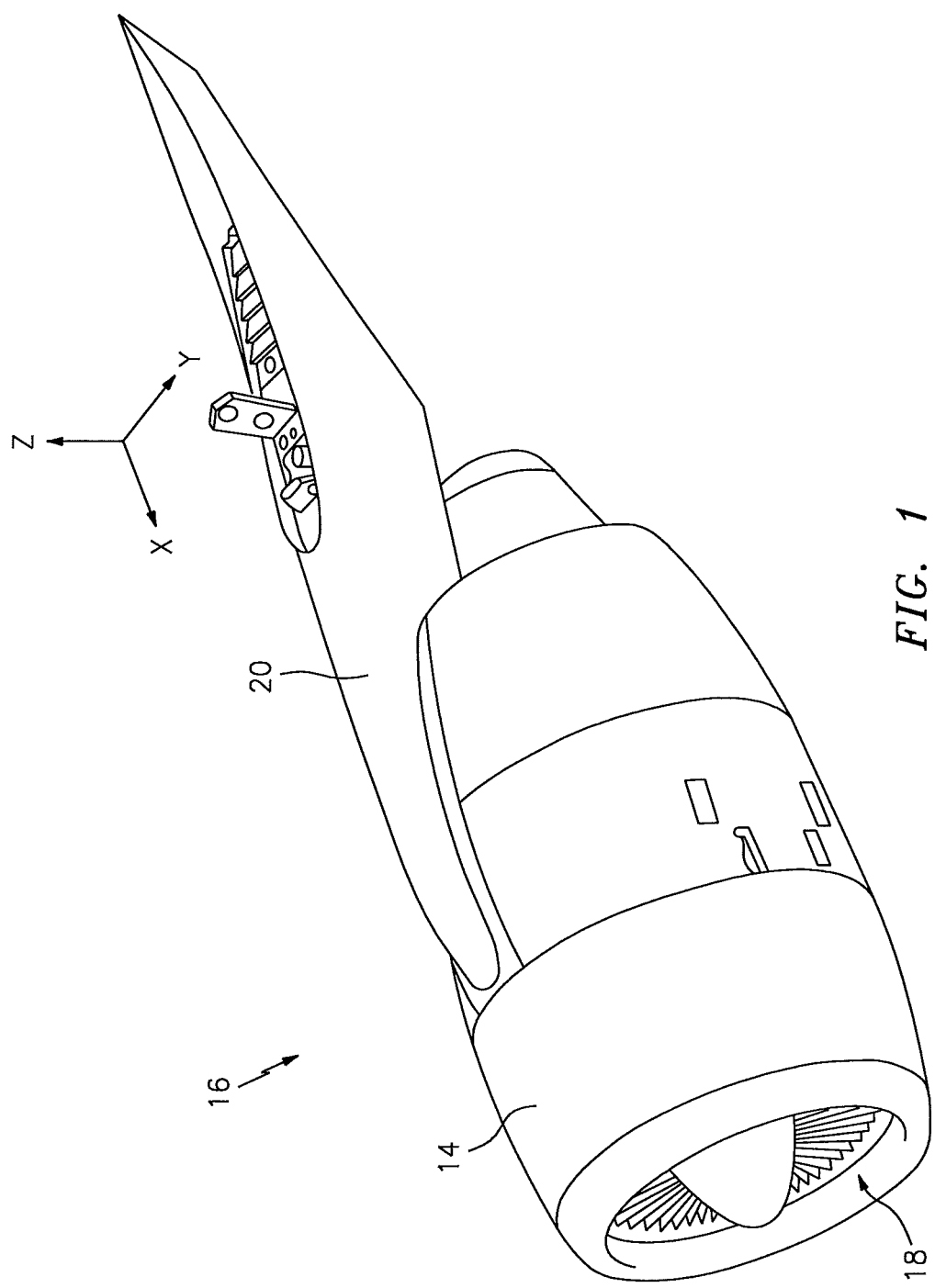
FIG. 1 is a perspective view of a propulsion system.

The present disclosure describes embodiments of a lower bifurcation wall aft edge portion aerodynamic feature 10 (hereinafter the "aerodynamic feature 10") (see FIGS. 7-10), and embodiments of a thrust reverser 12 (see FIGS. 2-5) that includes the aerodynamic feature 10.

The present disclosure describes aspects of the present invention with reference to the exemplary embodiments illustrated in the drawings; however, aspects of the present invention are not limited to the exemplary embodiments illustrated in the drawings. The present disclosure may describe one or more features as having a length extending relative to an x-axis, a width extending relative to a y-axis, and/or a height extending relative to a z-axis. The drawings illustrate the respective axes.

The present disclosure uses the terms "circumferential," "annular," "abut," and variations thereof, to describe one or more features. The term "circumferential," and variations thereof, are used herein to indicate that a feature extends along a curve that is centered about an axis of rotation. The term "annular," and variations thereof, are used herein to indicate that a feature is at least partially in the form of a ring (e.g., a ring in a circular shape or another shape). The term "abut," and variations thereof, are used herein to indicate either that a first feature is in direct contact with a second feature, or that a first feature is almost in direct contact with a second feature and is separated from the second feature only by one or more small gaps.

Figure 2:
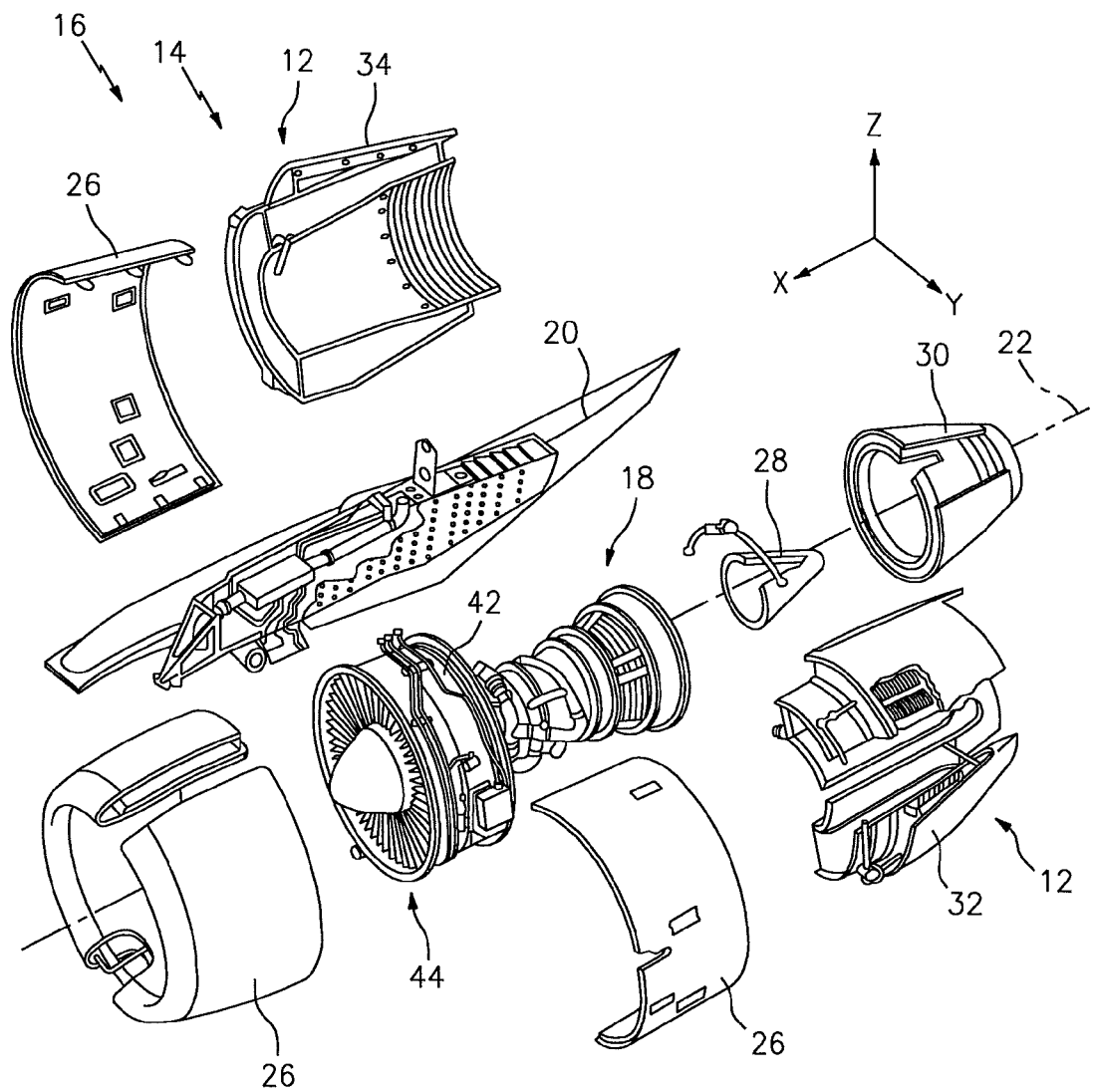
FIG. 2 is an exploded perspective view of the propulsion system of FIG. 1.

Referring to FIG. 1, the aerodynamic feature 10 (see FIGS. 7-10) is included in a nacelle 14, and the nacelle 14 is included in a propulsion system 16. The propulsion system 16 and the nacelle 14 can be configured in various different ways. In the illustrated embodiment, the propulsion system 16 is a turbofan-type propulsion system that includes the nacelle 14, a gas turbine engine 18, and a pylon 20. Referring to FIG. 2, the nacelle 14 and the gas turbine engine 18 extend circumferentially about a lengthwise-extending centerline 22, and extend in a lengthwise direction between respective forward and aft ends. The nacelle 14 partially surrounds the gas turbine engine 18. The pylon 20 connects the nacelle 14 and the gas turbine engine 18 to the underside of an aircraft wing (not shown). The nacelle 14 includes an inlet 24, a fan cowl 26, a thrust reverser 12, an exhaust centerbody 28, and an exhaust nozzle 30. The aerodynamic feature 10 (see FIGS. 7-10) is included in the thrust reverser 12 portion of the nacelle 14.

Figure 3:
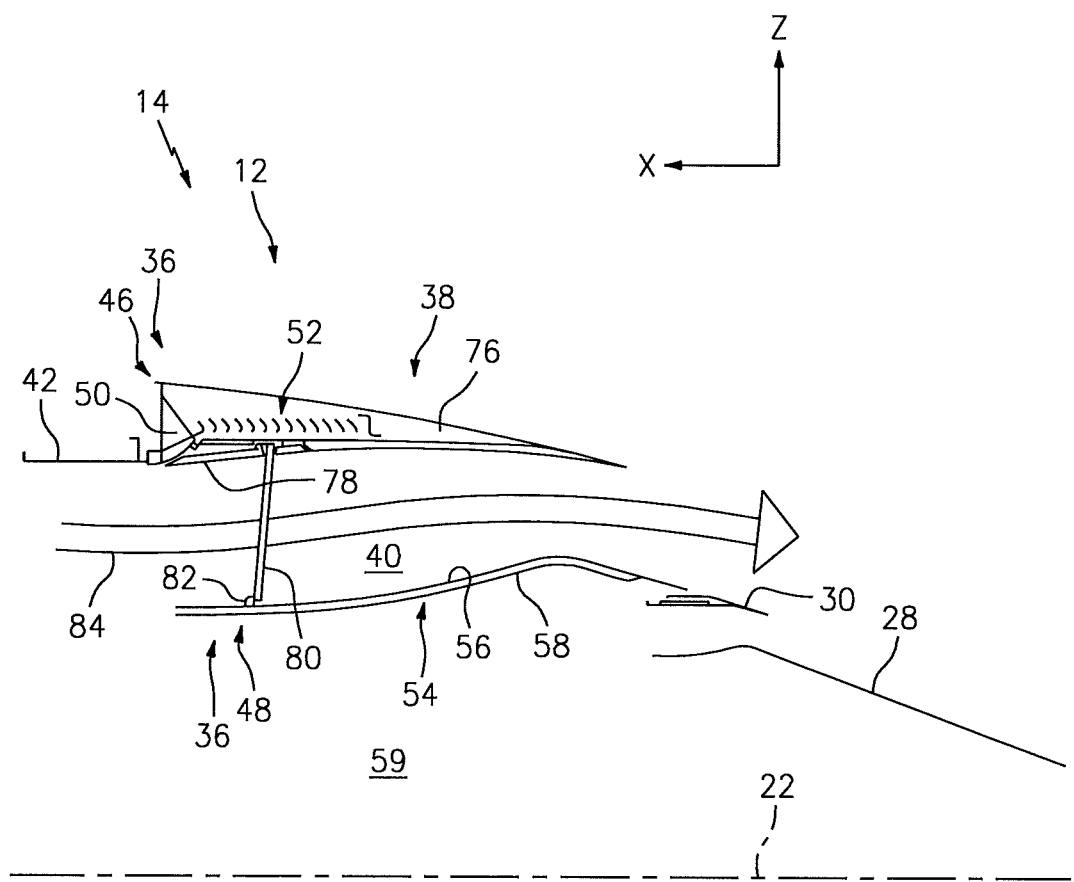
FIG. 3 is a sectional schematic view of the thruster reverser in its stowed position, the exhaust centerbody, and the exhaust nozzle portions of the nacelle that are included in the propulsion system of FIG. 1.
Figure 4:
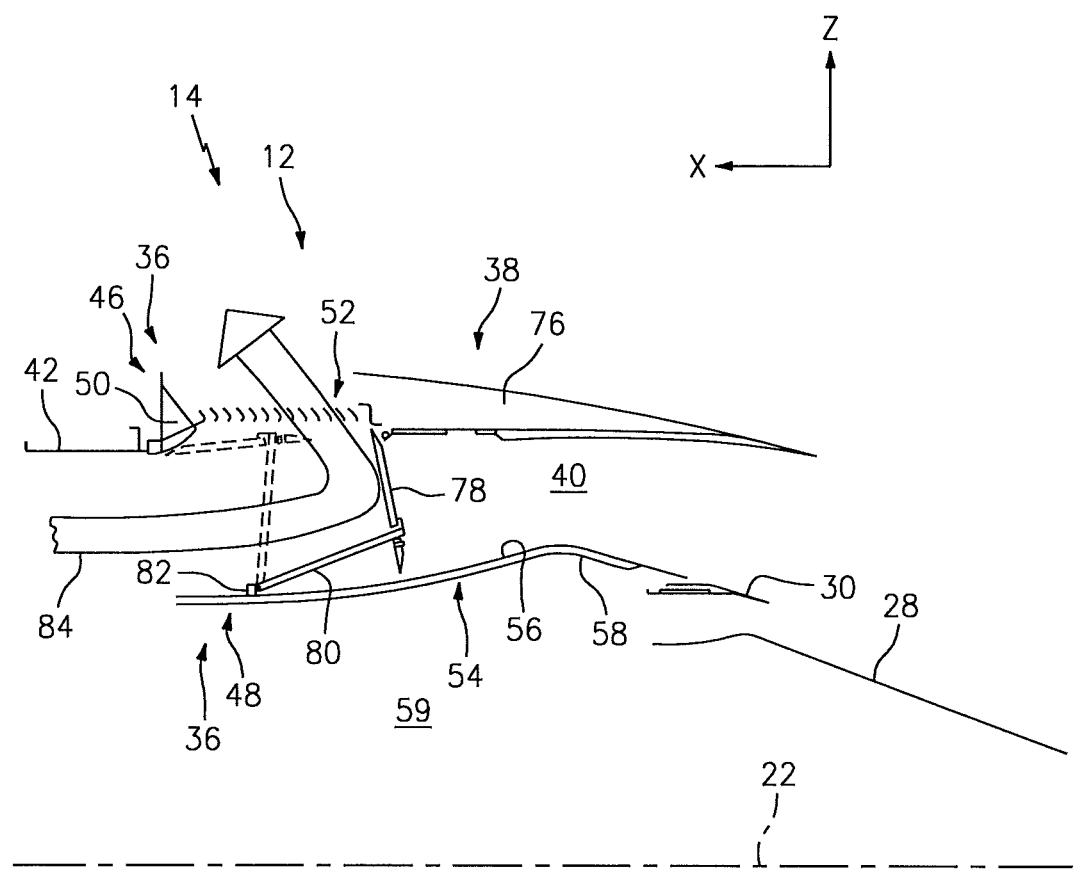
FIG. 4 is a sectional schematic view of the thruster reverser in its deployed position, the exhaust centerbody, and the exhaust nozzle portions of the nacelle that are included in the propulsion system of FIG. 1.
Figure 5:
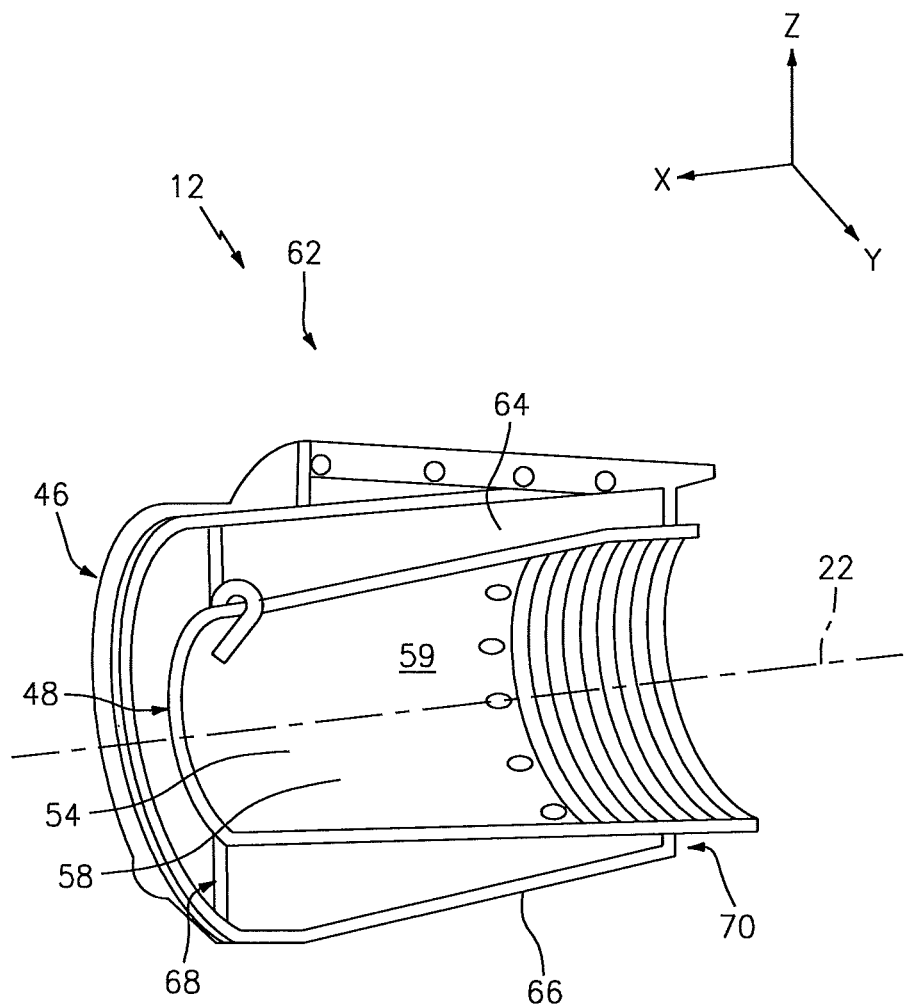
FIG. 5 is a perspective view of the right side section of the thrust reverser of FIGS. 2-4.

Referring to FIG. 2, in the illustrated embodiment the thrust reverser 12 is a cascade-type thrust reverser that is bifurcated into a left side section 32 and a right side section 34. Referring to FIGS. 3-5, the thrust reverser 12 includes a fixed structure 36 and a translating structure 38. Referring to FIGS. 3 and 4, the fixed structure 36 and the translating structure 38 partially define an annular bypass duct 40. FIGS. 3 and 4 illustrate the relative positioning of the fixed structure 36 and the translating structure 38 portions of the thrust reverser 12, as well as the fan case 42 that surrounds the fan section 44 of the gas turbine engine 18 (see FIGS. 1 and 2), the exhaust centerbody 28, and the exhaust nozzle 30 portions of the nacelle 14.

Referring still to FIGS. 3 and 4, the fixed structure 36 of the thrust reverser 12 includes a radially outer fixed structure 46 and a radially inner fixed structure 48.

The outer fixed structure 46 includes an upper track beam (not shown), a lower track beam (not shown), an annular torque box 50, and a cascade array 52. The upper and lower track beams (not shown) extend in generally lengthwise directions along upper and lower areas of the outer fixed structure 46, respectively. The torque box 50 extends circumferentially between the upper and lower track beams (not shown). A forward end of the torque box 50 is connected to an aft end of the fan case 42. The cascade array 52 abuts an aft end of the torque box 50, and extends circumferentially between the upper and lower track beams (not shown).

Figure 6:
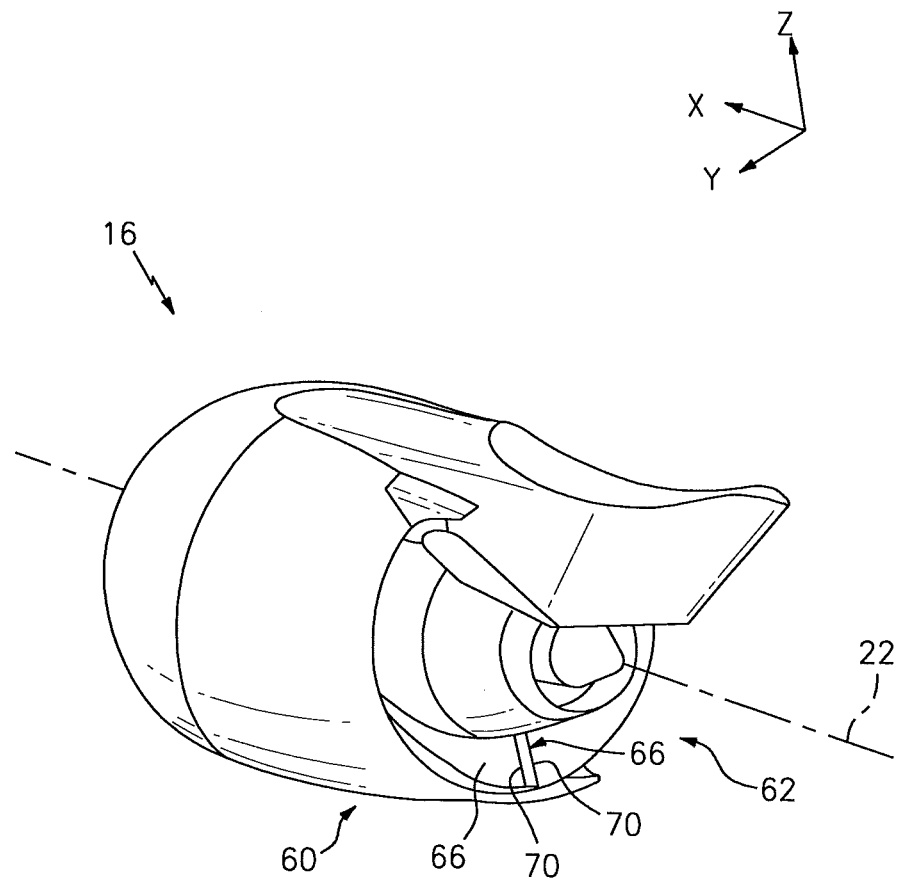
FIG. 6 is a perspective view of the propulsion system of FIG. 1.

Referring to FIGS. 3 and 4, the inner fixed structure 48 includes an annular wall 54 having a wall outer surface 56 and a wall inner surface 58. The wall outer surface 56 partially defines the bypass duct 40, and the wall inner surface 58 partially defines a cavity 59 (see also FIG. 5) through which a portion of the gas turbine engine 18 (see FIG. 2) extends. Referring to FIG. 5, the inner fixed structure 48 (like the thrust reverser 12 as whole) is bifurcated into a left side section 60 (see FIGS. 7-10) and a right side section 62. The left and right side sections 60, 62 each include an upper bifurcation wall 64 and a lower bifurcation wall 66. The annular wall 54 extends between the upper and lower bifurcation walls 64, 66 of the left side section 60 (not shown in FIG. 5), and between the upper and lower bifurcation walls 64, 66 of the right side section 62. The upper and lower bifurcation walls 64, 66 each extend generally in an x-z plane. The lower bifurcation wall extends between a forward edge portion 68 and an aft edge portion 70. The respective upper bifurcation walls 64 of the left and right side sections 60, 62 are disposed relative to one another (not shown), and the respective lower bifurcation walls 66 of the left and right side sections 60, 62 are disposed relative to one another. FIG. 6 illustrates the relative positioning of the respective aft edge portions 70 of the lower bifurcation walls 66 of the left and right side sections 60, 62, as seen from an aft end of the propulsion system 16. The relative positioning of the respective aft edge portions 70 of the lower bifurcation walls 66 of the left and right side sections 60, 62 will be described in more detail below relative to FIGS. 7-10.

Referring again to FIGS. 3 and 4, the translating structure 38 includes an annular translating sleeve 76, a plurality of blocker doors 78, and a plurality of drag links 80. The translating structure 38 is selectively moveable (e.g., using one or more actuators) in a generally lengthwise direction relative to fixed structure 36, between a stowed position (see FIG. 3) (e.g., during a forward thrust operation) and a deployed position (see FIG. 4) (e.g., during a thrust reversing operation). The translating sleeve 76 slidably engages the upper and lower track beams (not shown) of the outer fixed structure 46. Each of the blocker door 78 extends between a forward edge and an aft edge. The forward edge of each blocker door 78 is pivotably connected to the translating structure 38, and the aft edge of each blocker door 78 is pivotably connected to a drag link 80. Each of the drag links 80 includes a radially outer end portion and a radially inner end portion. The outer end portion of each drag link 80 is pivotably connected to an aft end of a blocker door 78, and the inner end portion of each drag link 80 is pivotably connected to a drag link fitting 82 that is positionally fixed relative to the annular wall 54 of the inner fixed structure 48.

The translating sleeve 76, the blocker doors 78, and the drag links 80 of the translating structure 38 are selectively moveable between respective stowed positions (see FIG. 3) (e.g., during a forward thrust operation) and respective deployed positions (see FIG. 4) (e.g., during a thrust reversing operation). The translating sleeve 76, the blocker doors 78, and the drag links 80 are configured to be in their respective stowed positions (see FIG. 3) when the translating structure 38 is in its stowed position (see FIG. 3), and are configured to be in their respective deployed position (see FIG. 4) when the translating structure 38 is in its deployed position (see FIG. 4).

Referring back to FIG. 2, during operation of the illustrated propulsion system 16, an airstream (not shown) enters the gas turbine engine 18 through the fan section 44 of the gas turbine engine 18, and the airstream is thereafter divided into a core airstream (not shown) and a bypass airstream 84 (see FIGS. 3 and 4). The core airstream enters the gas turbine engine 18, where it is compressed in a compressor section (not shown), heated in a combustor section (not shown), and expanded to produce rotational power in a turbine section (not shown). The core airstream is then discharged through the aft end of the gas turbine engine 18, and it is then finally discharged through the exhaust nozzle 30 portion of the nacelle 14 to provide forward thrust.

Referring again to FIGS. 3 and 4, when the translating structure 38 is in its stowed position (see FIG. 3), the bypass airstream 84 can pass from a forward end of the bypass duct 40 to an aft end of the bypass duct 40 and then to the exhaust nozzle 34, through which it can be discharged to provide forward thrust. The translating sleeve 76 of the translating structure 38 prevents the bypass airstream 84 from passing through the cascade array 52 included in the outer fixed structure 46 of the thrust reverser 12. The drag links 80 each block only a small portion of the bypass duct 40, and thus the bypass airstream 84 can pass around them relatively easily.

When the translating structure 38 is in its deployed position (see FIG. 4), the cascade array 52 is exposed to the bypass airstream 84 passing through the bypass duct 40, and is exposed to ambient air surrounding the nacelle 14. The blocker doors 78 are positioned within the bypass duct 40 to thereby redirect a portion of the bypass airstream 84 toward the cascade array 52, through which the bypass airstream 84 can be discharged to generate reverse thrust.

As indicated above, FIGS. 7-10 illustrate in more detail the relative positioning of the respective aft edge portions 70 of the lower bifurcation walls 66 of the left and right side sections 60, 62. FIGS. 7-10 illustrate, for example, that the respective aft edge portions 70 each extend generally along respective aft edge portion axes 72, 74, and that the aft edge portion axes 72, 74 are angularly offset relative to the centerline 22.

Referring still to FIGS. 7-10, the respective aft edge portions 70 can be separated by a small channel 86. Relative movement of the respective aft edge portions 70 (e.g., due to thermal growth and/or reduction) can cause the size of the channel 86 to vary during different operating conditions of the propulsion system 16 (e.g., power-on conditions, power-off conditions, forward thrust conditions, reverse thrust conditions, high temperature conditions, low temperature conditions, etc.). In some instances, the channel 86 can have a nominal channel size of approximately four tenths of an inch (0.4 inches). That is, in such instances, the left and right side aft edge portions 70 can be separated by a nominal distance of approximately four tenths of an inch (0.4 inches).

Referring to FIGS. 6-10, the aerodynamic feature 10 is disposed relative to one or both of the respective aft edge portions 70 of the left and right side lower bifurcation walls 66 (referred hereinafter as the "left and right side aft edge portions 70"). The aerodynamic feature 10 aids in preventing aerodynamic drag due to flow separation, which might otherwise occur as a result of the blunt, non-aerodynamic shape of the respective aft edge portions 70.

The aerodynamic feature 10 includes one or more flanges 88, 90 disposed relative to one or both of the left and right side aft edge portions 70. The flanges 88, 90 can be configured in various different ways. FIGS. 7-10 illustrate four embodiments of the aerodynamic feature 10 having various different flange 88, 90 configurations.

In some embodiments (see FIGS. 7 and 8), the aerodynamic feature 10 includes a flange 88 disposed relative to one of the left and right side aft edge portions 70. In the embodiment illustrated in FIG. 7, for example, the aerodynamic feature 10 includes a flange 88 connected to the left side aft edge portion 70. In the embodiment illustrated in FIG. 8, the aerodynamic feature 10 includes a flange 88 connected to the right side aft edge portion 70. In other embodiments, including the embodiments illustrated in FIGS. 9 and 10, the aerodynamic feature 10 includes a first flange 88 disposed relative to the left side aft edge portion 70, and a second flange 90 disposed relative to the right side aft edge portion 70.

Figure 7:
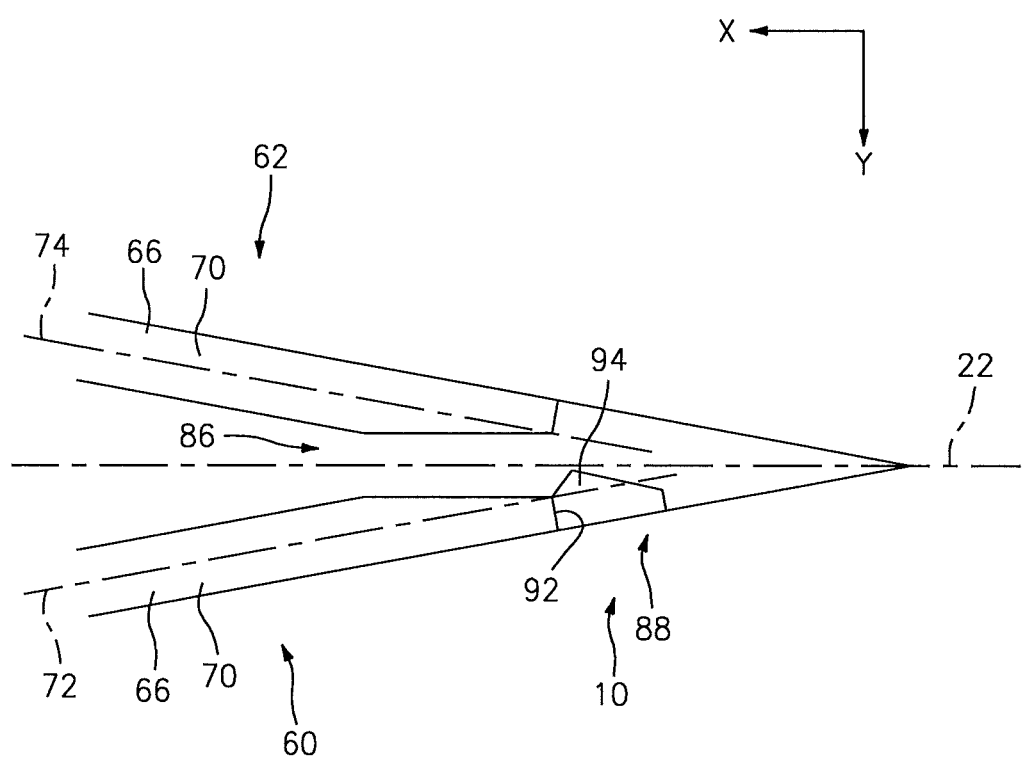
FIG. 7 is a schematic sectional view of an embodiment of the lower bifurcation wall aft edge portion aerodynamic feature.

In the embodiment illustrated in FIG. 7, the aerodynamic feature 10 includes a flange 88 that extends from an aft surface 92 of the left side aft edge portion 70. The flange 88 extends generally along the aft edge portion axis 74 of the left side aft edge portion 70. The flange 88 includes a widthwise-extending protrusion 94.

Figure 8:
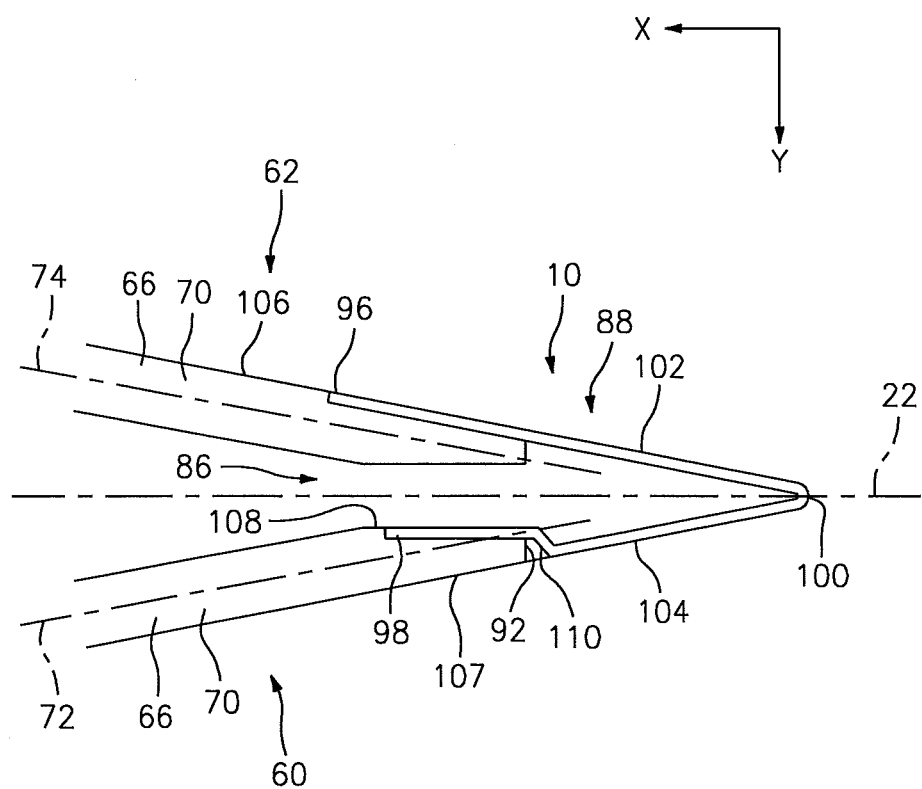
FIG. 8 is a schematic sectional view of another embodiment of the lower bifurcation wall aft edge portion aerodynamic feature.

In the embodiment illustrated in FIG. 8, the aerodynamic feature 10 again includes a flange 88 that extends from an aft surface 92 of the left side aft edge portion 70. In this embodiment, the flange 88 includes a first end 96, a second end 98, a bent segment 100, a first intermediate segment 102 that extends between the first end 96 and the bent segment 100, and a second intermediate segment 104 that extends between the bent segment 100 and the second end 98. The first intermediate segment 102 is connected to the outer surface 106 of the right side aft edge portion 70. The first intermediate segment 102 extends generally along the right side aft edge portion axis 72. The second intermediate segment 104 is operable to abut an inner surface 108 of the left side aft edge portion 70. The second intermediate segment 104 includes a curved section 110 that has a shape corresponding to the aft surface 92 of the left side aft edge portion 70. This feature permits the section of the second intermediate segment 104 proximate the bent segment 100 to be generally flush with an outer surface 107 of the left side aft edge portion 70. The bent segment 100 is resilient, and biases the second intermediate segment 104 of the flange 88 toward the inner surface 108 of the left side aft edge portion 70.

Figure 9:
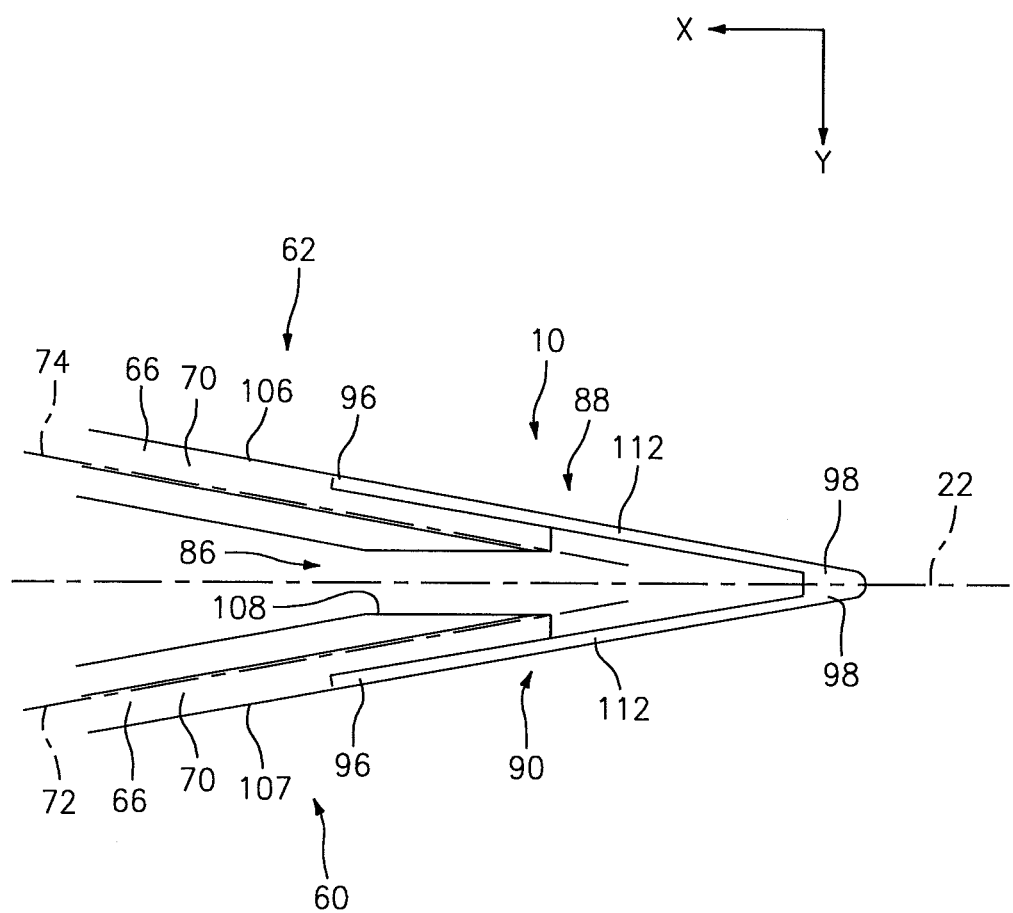
FIG. 9 is a schematic sectional view of another embodiment of the lower bifurcation wall aft edge portion aerodynamic feature.

In the embodiment illustrated in FIG. 9, the aerodynamic feature 10 includes a first flange 88 and a second flange 90. The first and second flanges 88, 90 each include a first end 96, a second end 98, and an intermediate segment 112 extending there between. The first flange 88 is connected to the outer surface 106 of the right side aft edge portion 70 proximate its first end 96, and the second flange 90 is connected to the outer surface 107 of the left side aft edge portion 70 proximate its first end 96. The intermediate segment 112 of the first flange extends generally along the right side aft edge portion axis 72, and the intermediate segment 112 of the second flange extends generally along the left side aft edge portion axis 70. The respective second ends 98 of the first and second flanges 88, 90 are configured to mate with one another. The respective intermediate segments 112 of the first and second flanges 88, 90 are resilient, and bias the first and second flanges 88, 90 towards one another such that their respective second ends 98 mate.

Figure 10:
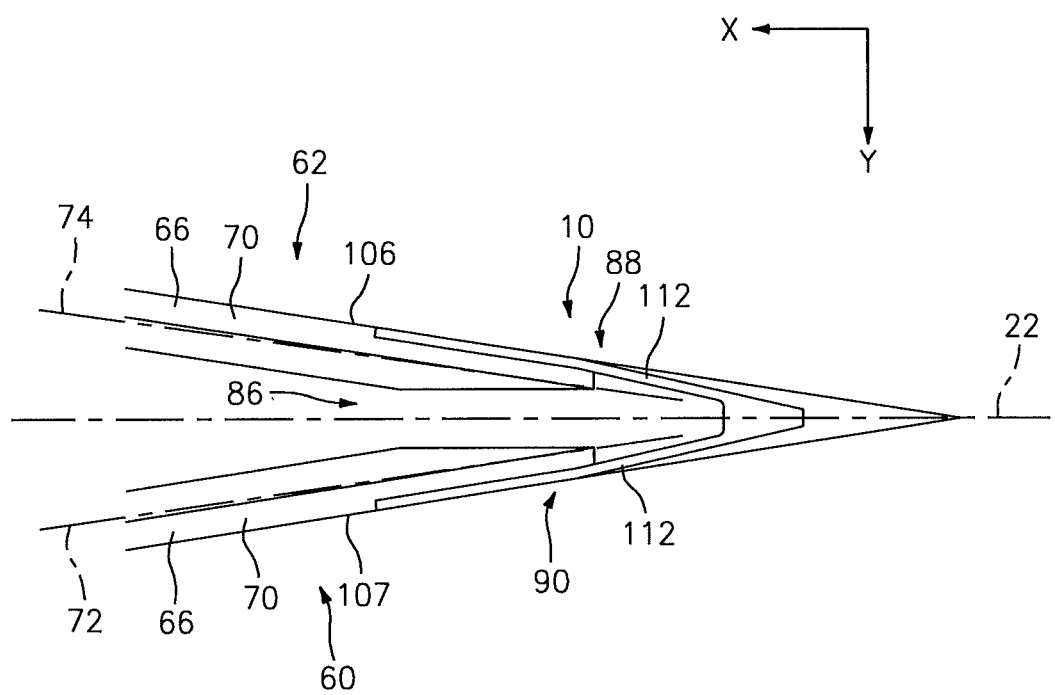
FIG. 10 is a schematic sectional view of another embodiment of the lower bifurcation wall aft edge portion aerodynamic feature.

In the embodiment illustrated in FIG. 10, the aerodynamic feature 10 includes first and second flanges 88, 90 that are configured similar to those in the embodiment illustrated in FIG. 9; however, in the embodiment illustrated in FIG. 10, the first and second flanges 88, 90 extend from the respective left and right side aft edge portions 70 a shorter distance than the first and second flanges 88, 90 in the embodiment illustrated in FIG. 9.

The present aerodynamic feature 10 offers several significant advantages.

First, the aerodynamic feature 10 offers a structurally simple solution for the above-described problem of drag that can be caused by the respective blunt, non-aerodynamic shapes of the left and right side aft edge portions 70. The aerodynamic feature 10 can be manufactured and assembled relatively inexpensively. In contrast, it could be prohibitively expensive to redesign the thrust reverser 12 to change the respective shapes of the left and right side aft edge portions 70.

Second, the one or more flanges 88, 90 of the aerodynamic feature 10 include one or more features (e.g., the protrusion 94 in the embodiment of FIG. 7, the resilient segments in the embodiments of FIGS. 8-10) that permit the aerodynamic feature 10 to adjust to various different sizes of the channel 86, and permit relative movement of the left and right side aft edge portions 70. As described above, the size of the channel 86 can vary (i.e., the left and right side aft edge portions 70 can move relative to one another) as operating conditions of the propulsion system 16 change.

While several embodiments have been disclosed, it will be apparent to those of ordinary skill in the art that aspects of the present invention include many more embodiments and implementations. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A thrust reverser of a propulsion system nacelle, the thrust reverser comprising:
   a fixed structure that includes an annular wall that partially defines an annular bypass airstream duct, wherein the fixed structure is bifurcated into left and right side sections, wherein the annular wall extends between upper and lower bifurcation walls of the left side section, and extends between upper and lower bifurcation walls of the right side section;
   a translating structure that is moveable relative to the fixed structure, between a stowed position and a deployed position; and
   an aerodynamic feature that includes a flange disposed relative to an aft end portion of one of the lower bifurcation walls, wherein the flange aids in preventing aerodynamic drag;
   wherein the aft end portion of the lower bifurcation wall of the left side section generally extends along a first axis;
   wherein the aft end portion of the lower bifurcation wall of the right side section generally extends along a second axis;
   wherein the flange includes a first end, a second end, a bent segment, a first intermediate segment that extends between the first end and the bent segment, and a second intermediate segment that extends between the bent segment and the second end; and
   wherein the first intermediate segment generally extends along the first axis and the second intermediate segment generally extends along the second axis.

2. The thrust reverser of claim 1, wherein the flange aids in preventing aerodynamic drag due to flow separation.

3. The thrust reverser of claim 1, wherein the aerodynamic feature is configured to permit relative movement of respective aft edge portions of the lower bifurcation walls.

4. The thrust reverser of claim 1, wherein the flange, and the aft end portion that the flange is disposed relative to, generally extend along a common axis.

5. The thrust reverser of claim 1, wherein the first intermediate segment of the flange is connected to the aft end portion of one of the lower bifurcation walls; and
   wherein the bent segment is resilient, and biases the second intermediate segment of the flange towards the aft end portion of the other lower bifurcation wall.

6. A thrust reverser of a propulsion system nacelle, the thrust reverser comprising:
   a fixed structure that includes an annular wall that partially defines an annular bypass airstream duct, wherein the fixed structure is bifurcated into left and right side sections, wherein the annular wall extends between upper and lower bifurcation walls of the left side section, and extends between upper and lower bifurcation walls of the right side section;
   a translating structure that is moveable relative to the fixed structure, between a stowed position and a deployed position; and an aerodynamic feature that includes a flange disposed relative to an aft end portion of one of the lower bifurcation walls, wherein the flange aids in preventing aerodynamic drag;

wherein the flange is a first flange and the aerodynamic feature further includes a second flange;

wherein the first and second flanges each include a first end, a second end, and an intermediate segment extending between the first and second ends; and wherein the first flange is connected to the aft end portion of one of the lower bifurcation walls proximate the first end of the first flange, and the second flange is connected to the aft end portion of the other lower bifurcation wall proximate the first end of the second flange.

7. The thrust reverser of claim 6, wherein the respective second ends of the first and second flanges are configured to mate with one another.

8. The thrust reverser of claim 7, wherein the respective intermediate segments of the first and second flanges are resilient, and bias the first and second flanges toward one another such that the respective second ends of the first and second flanges mate.

\* \* \* \* \*